United States Patent
Butera et al.

(10) Patent No.: US 6,941,967 B2
(45) Date of Patent: Sep. 13, 2005

(54) AIR-DISTRIBUTION SYSTEM (75) Inventors: Francesco Butera, Turin (IT); Stefano Alacqua, Cascine Vica (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 201 days.

(21) Appl. No.: 10/416,796

(22) PCT Filed: Mar. 8, 2002

(86) PCT No.: PCT/EP02/02593
§ 371 (c)(1),
(2), (4) Date: May 15, 2003

(87) PCT Pub. No.: WO02/072371
PCT Pub. Date: Sep. 19, 2002

(65) Prior Publication Data
US 2004/0055654 A1 Mar. 25, 2004

(30) Foreign Application Priority Data
Mar. 12, 2001 (IT) .................................. TO2001A0223

(51) Int. Cl.$^7$ ................................................. F15C 1/04
(52) U.S. Cl. ...................... 137/351; 137/829; 137/831; 137/832; 137/833; 454/152; 454/155
(58) Field of Search ............................. 137/351, 831, 137/832, 829, 833; 454/152, 155

(56) References Cited

U.S. PATENT DOCUMENTS

| | | | |
|---|---|---|---|
| 3,521,653 A | | 7/1970 | Zoya et al. |
| 3,709,139 A | * | 1/1973 | Behles ........................ 454/152 |
| 3,942,559 A | | 3/1976 | Kranz et al. |
| 4,327,869 A | * | 5/1982 | Nawa et al. ............. 239/590.5 |
| 4,388,950 A | | 6/1983 | Stouffer et al. |
| 4,393,897 A | * | 7/1983 | Izumi et al. ................. 137/831 |
| 6,145,636 A | * | 11/2000 | Ikari et al. ............ 188/218 XL |
| 6,179,707 B1 | * | 1/2001 | Arold .......................... 454/152 |

FOREIGN PATENT DOCUMENTS

| | | |
|---|---|---|
| JP | 60 078 824 A | 5/1985 |
| JP | 62 088606 A | 4/1997 |

* cited by examiner

Primary Examiner—A. Michael Chambers
(74) Attorney, Agent, or Firm—Sughrue Mion, PLLC (57) ABSTRACT An air-distribution system comprises a fluid device that enables deviation of a flow of air that traverses a main duct (6S; 6D) into a first secondary duct (7S, 7C) and a second secondary duct (7C, 7D), exploiting the Coanda effect. The system may be applied in vehicles in general, in particular motor vehicles, or for example in residential, commercial and industrial buildings.

10 Claims, 10 Drawing Sheets

AIR-DISTRIBUTION SYSTEM

This is a National Stage Entry of Application No. PCT/EP02593 filed Mar. 8, 2002; the disclosure of which is incorporated herein by reference.

BACKGROUND OF THE INVENTION

The present invention relates to air-distribution systems in general, for instance for use in residential, commercial or industrial buildings, or else in motor vehicles, the air-distribution system according to the invention being of the type comprising:

at least one inlet duct for a flow of air;

a plurality of mouths for outflow of the air into an environment; and an air-distributing device, comprising:

an inlet (3), which receives the air-flow from the aforesaid inlet duct; and a plurality of outlets, located at a distance from said outflow mouths and connected to the latter by respective pipes.

SUMMARY OF THE INVENTION

The purpose of the present invention is to provide an air-distribution system of the type specified above, which is simple and of reliable and efficient operation. With a view to achieving this objective, the subject of the present invention is a system of the type referred to above, characterized in that said air-distributing device further comprises:

a passage (6S; 6D) connected to said air-flow inlet duct, and fluid means associated to said passage for deviating the air-flow in one first or one second direction (7S, 7C; 7D) by the Coanda effect.

According to a further characteristic of the present invention, said passage is constituted by a main duct (6S; 6D), which has one inlet end and which comes out at the opposite end in a first secondary duct (7S, 7C) and a second secondary duct (7C, 7D), which branch off from the main duct according to two distinct directions, and said fluid means are designed to modify the geometry of the main duct in such a way as to control the direction of the flow by the Coanda effect.

According to yet another characteristic of the invention, said fluid means comprise:

one or more control openings (9) made in one wall (8) of the main duct, obturator or perturber means (10) co-operating with said openings and displaceable between an inactive condition and an active condition.

the wall in which the control openings are made being set parallel to the direction of air flow in the duct, in such a way that the intervention of said fluid means does not substantially involve any variation in the air-flow rate through the main duct.

It should be noted that the U.S. Pat. No. 4,686,890 and the corresponding European patent No. EP-B-0 174 660 illustrate the application of fluid means to a mouth for outflow of air into the passenger compartment of a motor vehicle. The said document does not therefore anticipate the invention in so far as it does not refer to a distributing device set upstream of the air-outflow mouths and at a distance from the latter. In addition, the fluid means provided in this case affect the flow rate of the air in the main duct. The same applies to the outflow mouth illustrated in the U.S. Pat. No. 4,407,186, which envisages a hybrid solution comprising both a fluid element and conventional deflecting fins, in which use is made of auxiliary control flows that are taken from the main flow.

The invention relates to a distribution device set upstream of, and at a distance from, mouths for outflow of the air into the environment, which is able to control selective sending of air to the various mouths, preventing the head losses that are generated in the ducts that use the conventional deflecting fins and without involving the flow-rate variations, which occur in the known solutions of outflow mouths equipped with fluid means. The arrangement according to the present invention enables advantages to be obtained at the level of aerodynamic efficiency, as well as of the simplicity and of the reduced overall dimensions of the structure of the device. In addition, the invention is suitable for being used to provide, according to criteria of modularity, simultaneous control of the direction of a number of air flows that pass through a plurality of main ducts set alongside one another, each of which comes out into two secondary ducts and has a respective control opening. In this case, according to the invention, the control openings of the various main ducts are aligned with one another, and the obturator means associated to said control openings are in common. They may comprise, for instance, two or more rotating cylinders, each having a wall with a distribution of openings, such that the said cylinders provide the different possible combinations of opening and closing of the various control openings in their corresponding different positions. This specific solution is suitable for being used in a particularly advantageous way in an air-distribution system in a motor vehicle. The obturator means described above present, in fact, particular advantages on account of their reduced dimensions, their simplicity, and their reduced energy consumption. A single actuator comprising the pair of two rotating cylinders is able to control the flow of air through a plurality of outlets of the distribution system.

The Coanda-effect air distributor described above can be made so as to be monostable or bistable. In the first case, the flow of air deviates preferably from the main duct into a first secondary duct, and switching to the second secondary duct is obtained only as long as a control signal is generated, such as a secondary flow of air leaving the control opening.

If the air distributor is bistable, instead, it is able to switch the outflow of air from the first secondary duct to the second secondary duct, or vice versa, whenever a control signal is generated (as, for example, removal of the obturator from the control opening), but remains in the new switched condition even when the control signal ceases. This result can be obtained, for instance, by providing two control openings on the two opposite sides of the main duct, which are opened selectively to cause deflection of the main flow of air towards the first secondary duct or towards the second secondary duct, respectively.

Control of the obturator or perturber means can be obtained in any way, for example with traditional actuators (electromagnetic, hydraulic, pneumatic) or piezoelectric actuators, or electrorestrictive polymers, or shape-memory actuators.

As has been seen, the control signal that enables the flow to be started in a first direction or in a second direction is preferably generated by controlling a control opening. This opening can set in communication the main duct traversed by the air flow with an environment at lower or higher pressure. The obturator means can consist of moving surfaces, as in the case of the example using the two rotating concentric cylinders, or even of deformable surfaces. In the case of bistable distributors, the control signal can also be generated by a thermal perturbation or by a perturbation generated by jets of air of pre-determined intensity and duration.

BRIEF DESCRIPTION OF THE DRAWINGS

Further characteristics and advantages will emerge from the ensuing description with reference to the attached drawings, which are provided purely by way of non-limiting example, and in which.

DETAILED DESCRIPTION OF THE INVENTION

Figure 1:
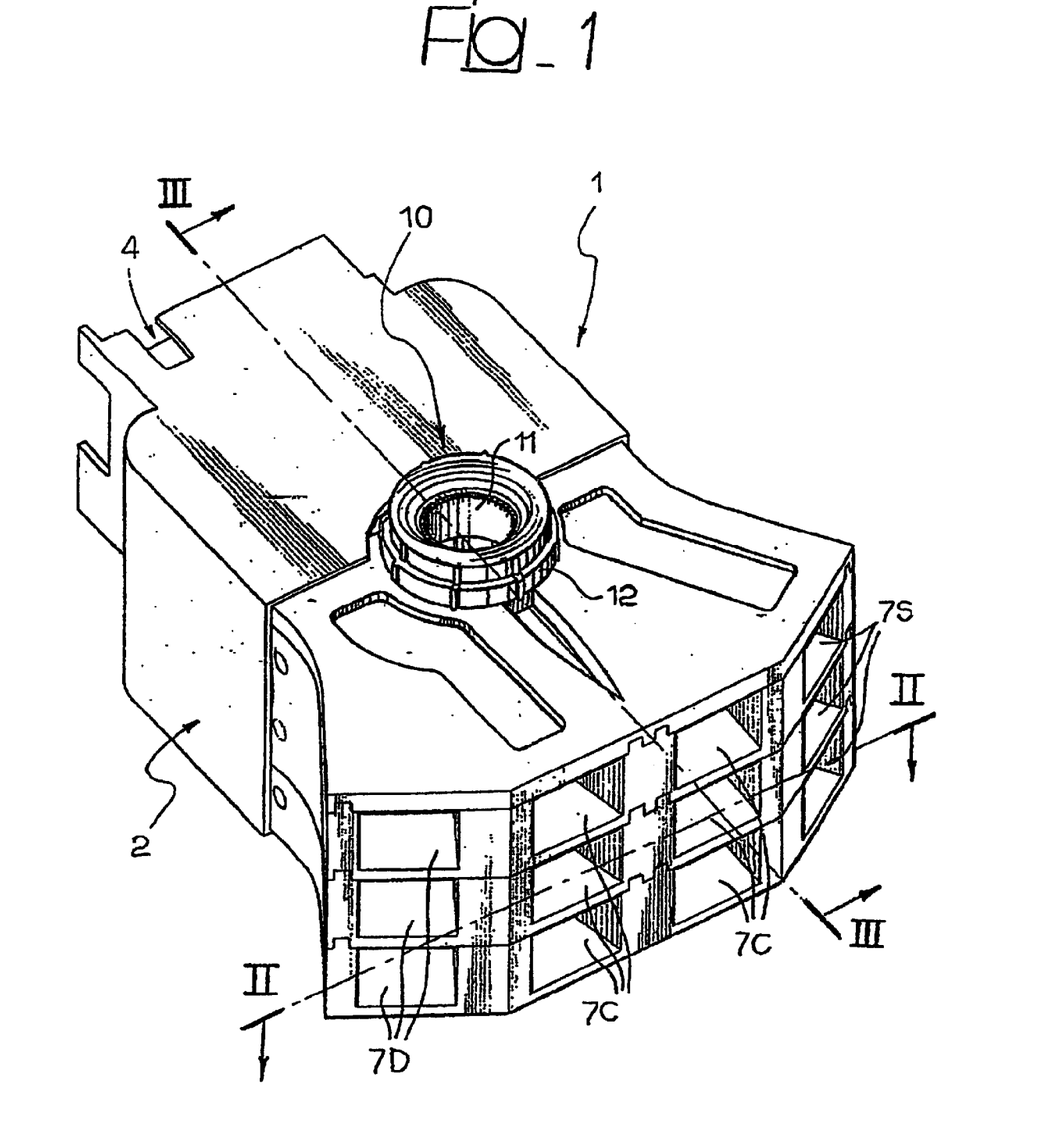
FIG. 1 is a perspective view of an example of embodiment of the system according to the invention, which can be used as an air distributor in a motor vehicle.
Figure 2:
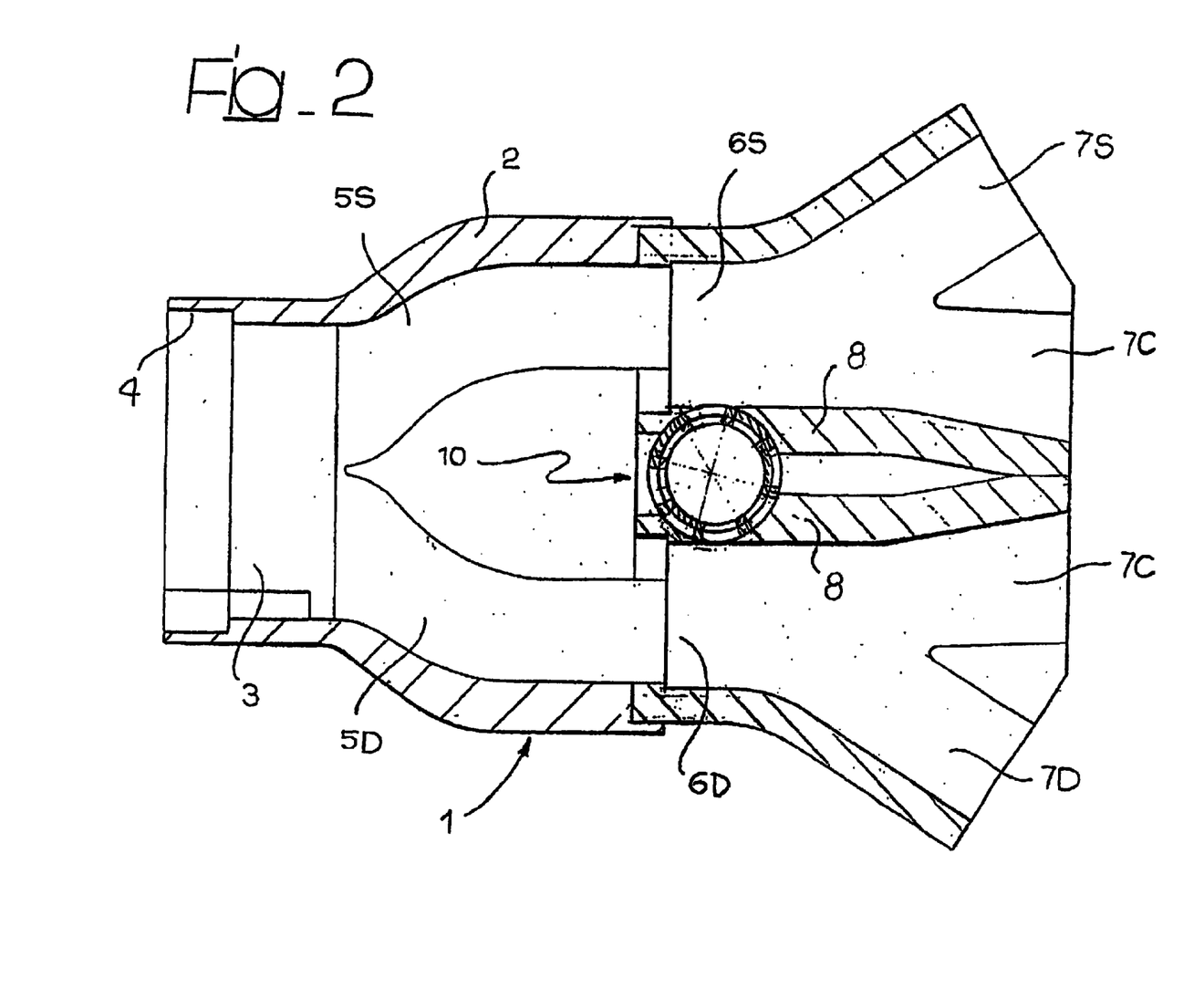
FIG. 2 is a cross-sectional view at an enlarged scale according to the line II—II of FIG. 1.
Figure 3:
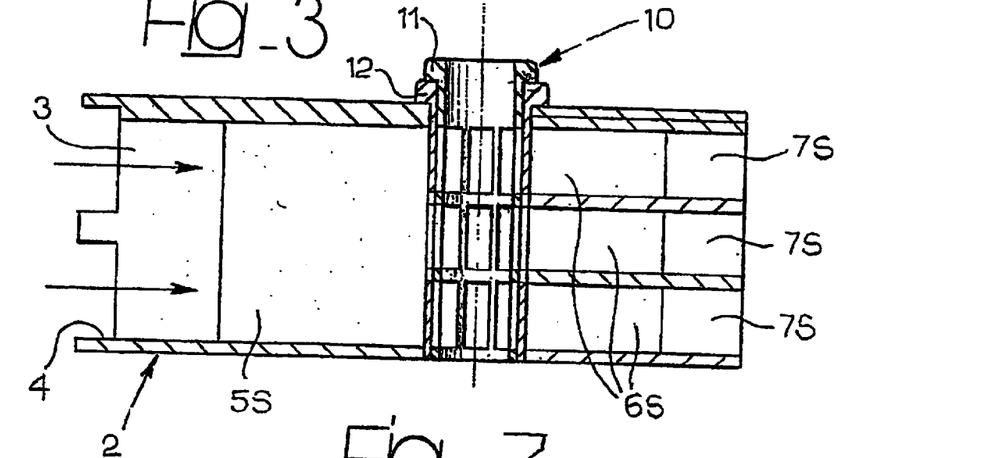
FIG. 3 is a cross-sectional view according to the line III—III of FIG. 1.

In FIG. 1, the reference number 1 designates, as a whole, a structure made of plastic material that can be used as an air distributor in a motor vehicle. The structure 1 comprises a main section 2 that defines a main duct 3 for the flow of the air (FIG. 3), which enters the duct through an opening 4. As may be seen in FIG. 2, the main duct 3 divides into two separate ducts 5S, 5D, each of which is prolonged into three main ducts 6S, and three main ducts 6D, respectively, which are set vertically one above another. Each of the main ducts 6S branches into two secondary ducts 7S, 7D, which define between them an angle of less than 90° and which exit from the structure 1 at the end opposite to the opening 4. Likewise, each of the three main ducts 6D set vertically one above another branches into two secondary ducts 7C, 7D, which form between them an angle of less than 90°. Each of the three main ducts 6S set vertically one above another is delimited on its inner side by a wall 8 having a control opening 9 set in a plane parallel to the direction of flow of the air through the duct 6S. Likewise, each of the three main ducts 6S set vertically one above another is delimited on its inner side by a wall 8 having a control opening 9, which is also set lying in a plane parallel to the direction of flow of the air through the duct 6D. Since there are three ducts 6S set vertically one above another and three ducts 6D set vertically one above another, the system envisages in all three control openings 9 vertically aligned with one another for controlling the flow of air that passes through the three main ducts 6S, and three control openings 9, which are also vertically aligned with one another for controlling the flow of air that passes through the three main ducts 6D.

Figures 4, 5, 6:
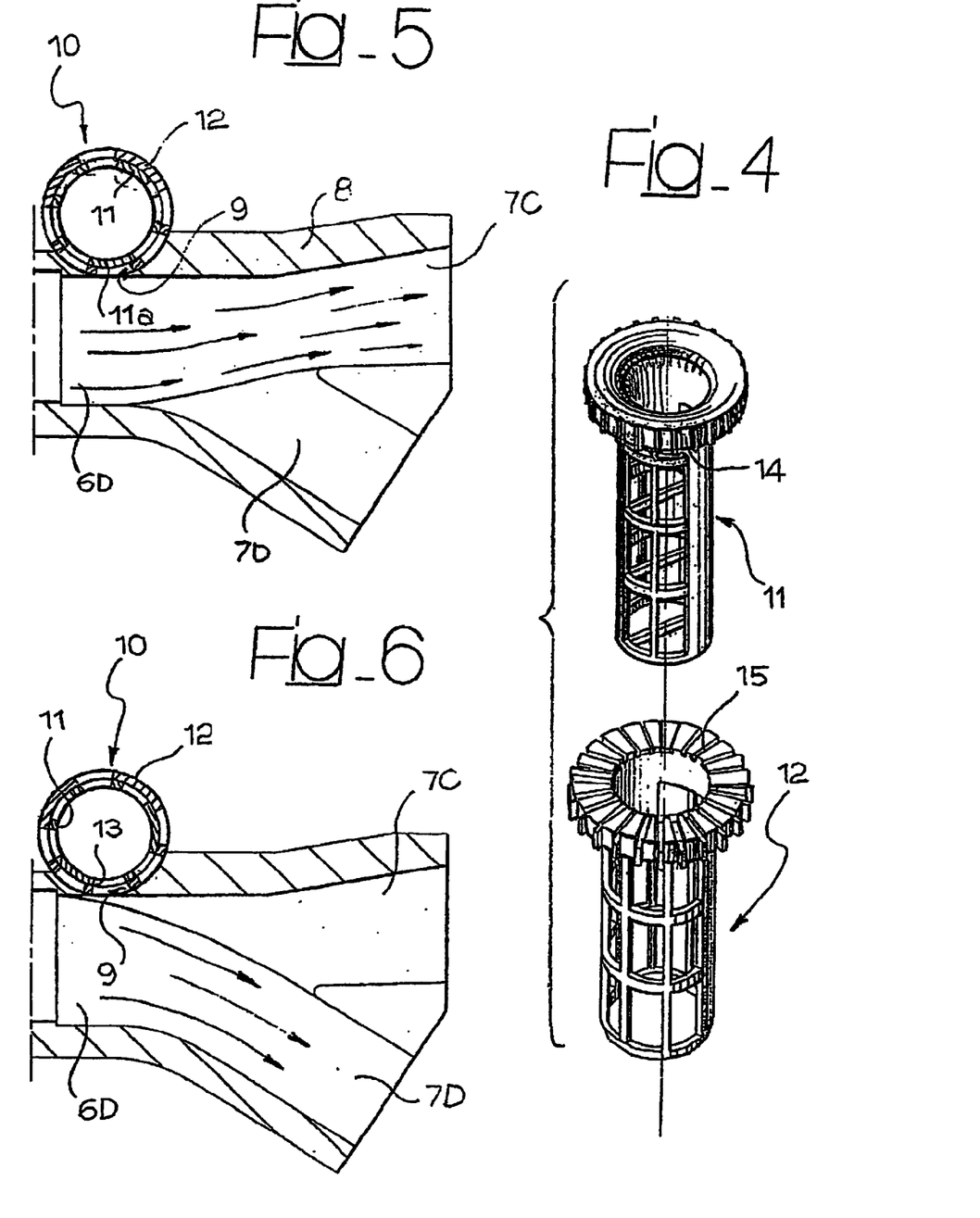
FIG. 4 is an exploded perspective view of the obturator means used in the system of FIG. 1.
FIGS. 5 and 6 illustrate a detail of FIG. 2 in two different operating conditions in order to illustrate the operating principle of the system according to the invention.
Figure 7:
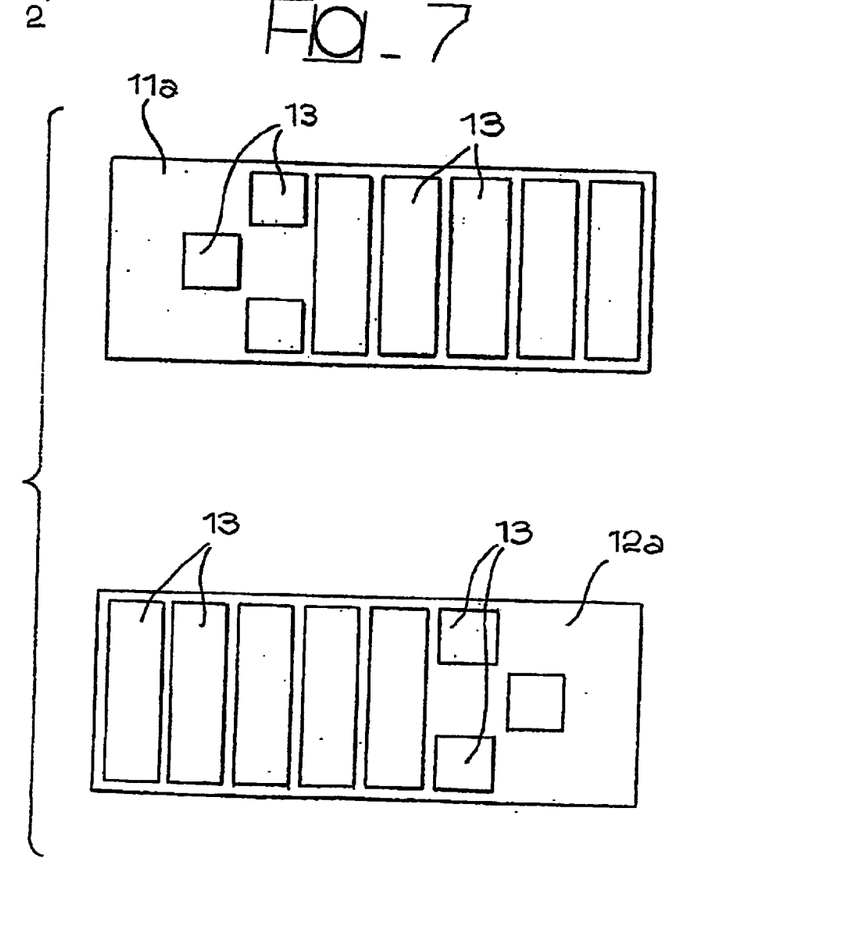
FIG. 7 illustrates the developments in plan view of the walls of the two rotating cylinders that constitute the obturator means of the device according to the invention.

The different possible combinations of opening and closing of the six control openings 9 described above are obtained by providing obturator means consisting of an obturator device 10 including two concentric and rotating cylinders 11, 12 (see FIG. 4). The walls 11a and 12a of the two cylinders 11, 12 are illustrated, developed in the plane, in FIG. 7. As may be seen from FIG. 7, the said walls have a series of openings 13, which are arranged and shaped in such a way that the different relative positions of the two cylinders 10, 11 provide the different possible combinations of opening and closing of the control openings 9.

At each control opening 9, the open state and the closed state are determining for bringing about deviation of the main air flow towards one or the other secondary duct. This phenomenon is illustrated in FIGS. 5 and 6 with reference to a single specific main duct 6D from which there branch off two secondary ducts 7C, 7D. In FIG. 5, the control opening 9 is obturated in that the internal cylinder 11 has one of its closed walls 11a in a position corresponding to the control opening 9. In this condition, the main flow of air that passes through the main duct 6D flows, by Coanda effect, following the curve of the wall 8, into the secondary duct 7C. Should the internal cylinder 11 be rotated so as to leave the control opening 9 free (FIG. 6), in order to set in communication the main duct 6D with an environment that is, for instance, at a higher pressure, a control fluid signal is generated, which determines deviation of the flow into the secondary duct 7D.

As may be seen in FIG. 4, at the top end the two rotating cylinders 11, 12 have toothings 14, 15 respectively, which enable engagement of corresponding operating members. Of course, the means designed to control rotation of the two cylinders 11, 12 may be of any known type, as has already been described above. In addition, it remains understood that the device illustrated in the attached drawings is here given purely by way of example. Obviously, the example illustrated presents particular advantages from the points of view of simplicity, reduced overall dimensions, and modularity. The obturator device 10 may be controlled by a single actuator, with a very low energy consumption. Thanks to the arrangement described, the head losses in the air ducts are minimal, and this fact guarantees the high efficiency of the air-distribution system.

Figure 8:
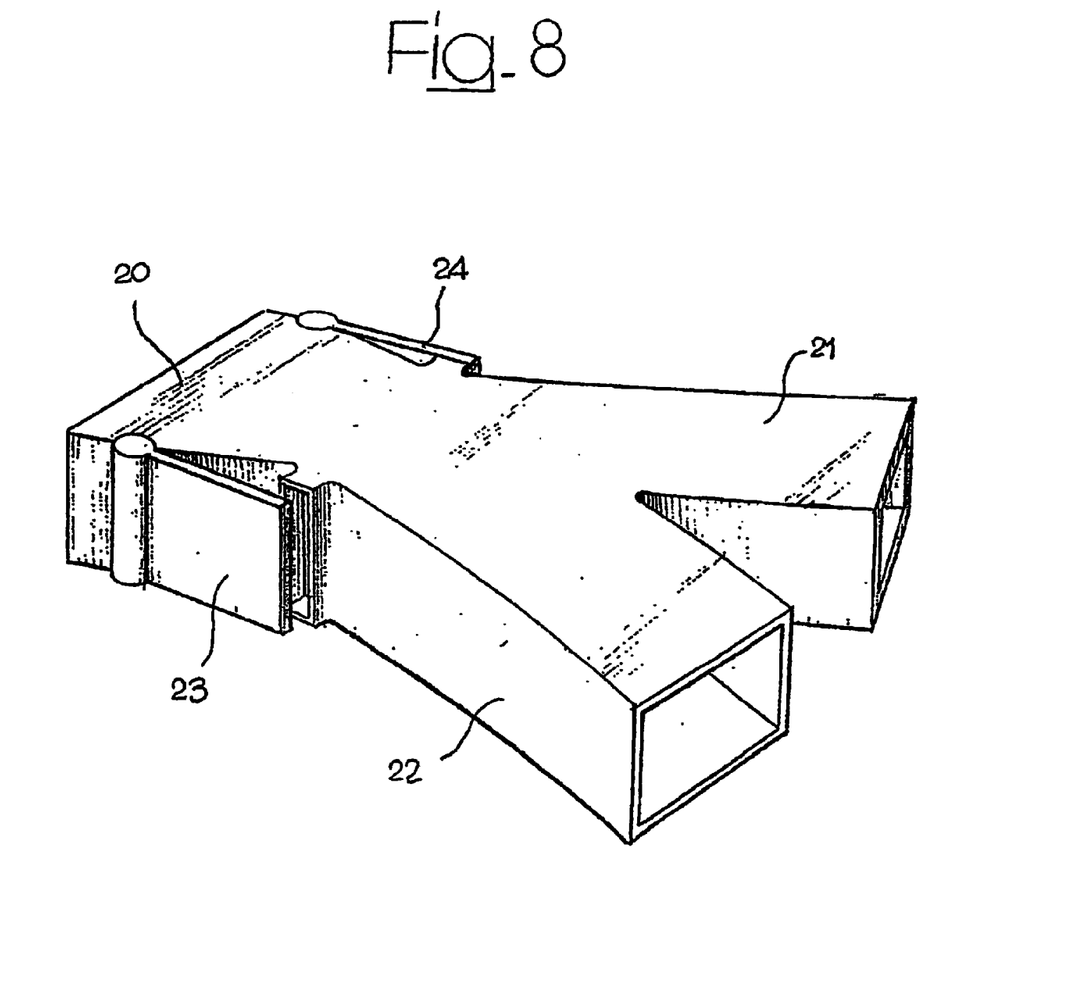
FIG. 8 illustrates a further embodiment of the invention.

FIG. 8 illustrates a further example of embodiment, in which the deviation of the air flow that passes through a main duct 20 into a first secondary duct 21 or into a second secondary duct 22 is controlled, according to criteria of bistability, by means of two lateral oscillating fins 23, 24, respectively, which are associated with two respective control openings.

Figure 9:
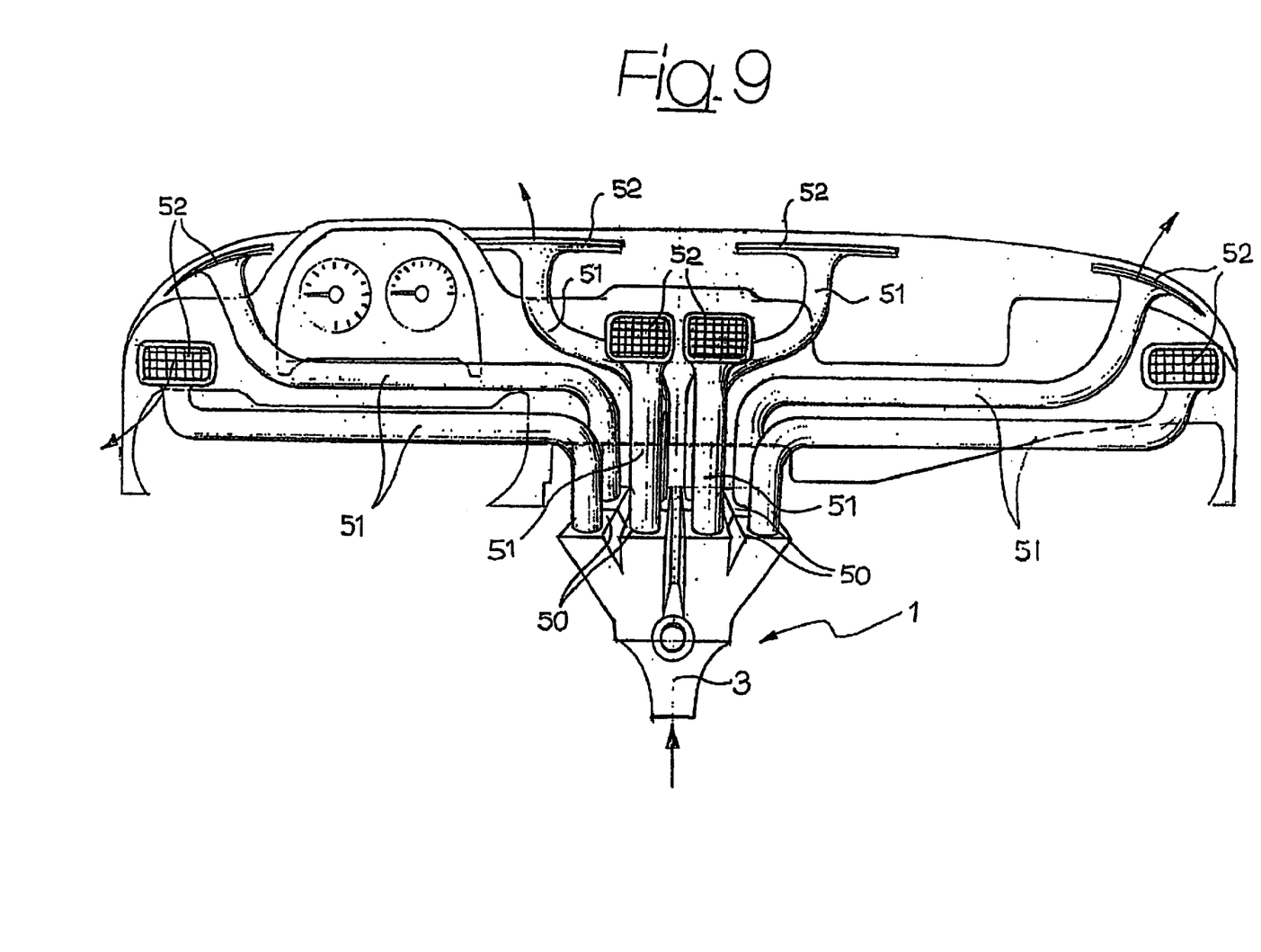
FIG. 9 illustrates a specific application.

FIG. 9 illustrates the application of a device 1 according to the invention, which has an inlet 3 and eight outlets 50 connected by means of respective pipes 51 and outlet mouths 52.

As has already been mentioned, the system according to the invention is suited to being used both in motor vehicles and in air-distribution systems for residential, commercial or industrial buildings, or in any other field of use of air-distribution systems (for instance, also in aeroplanes or ships).

Figure 10:
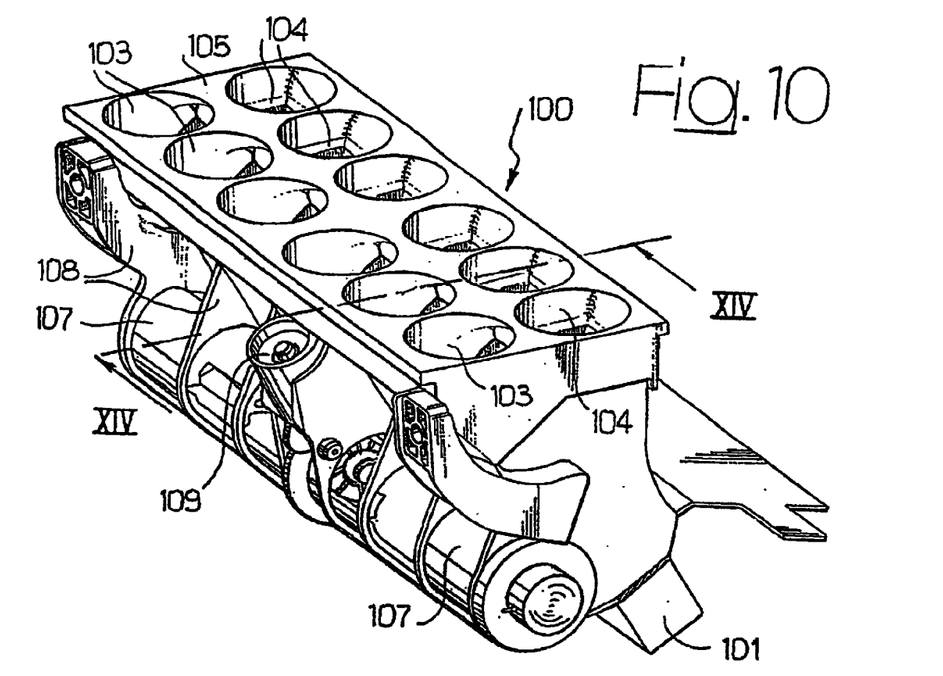
FIG. 10 is a perspective view of a variant of the assembly of FIG. 1.
Figure 11:
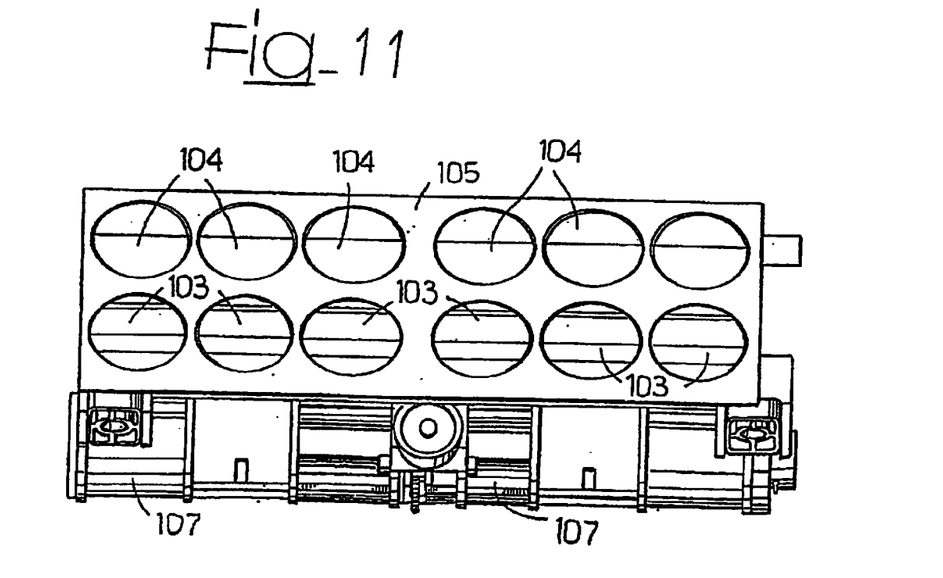
FIG. 11 is a plan view of the assembly of FIG. 10.
Figure 12:
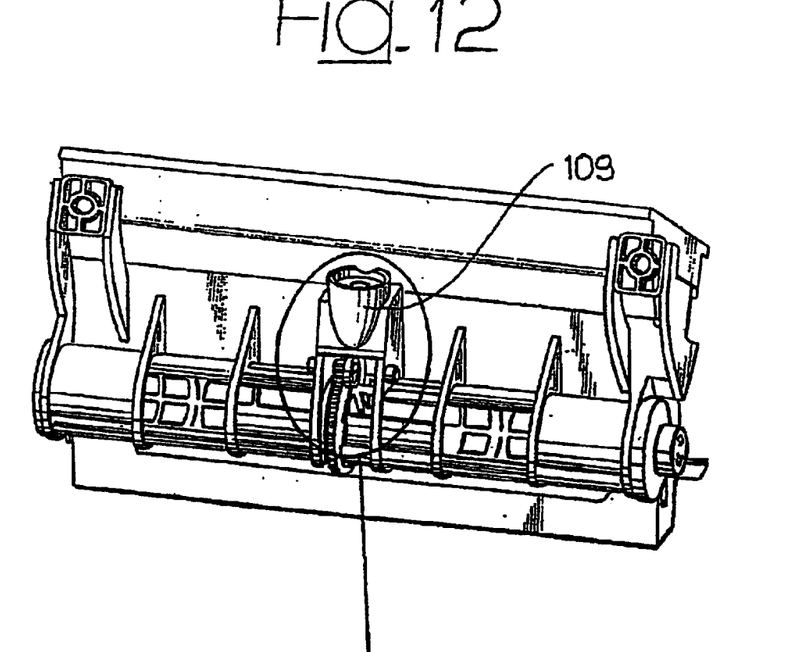
FIG. 12 is a side view of the assembly of FIG. 10.
Figure 13:
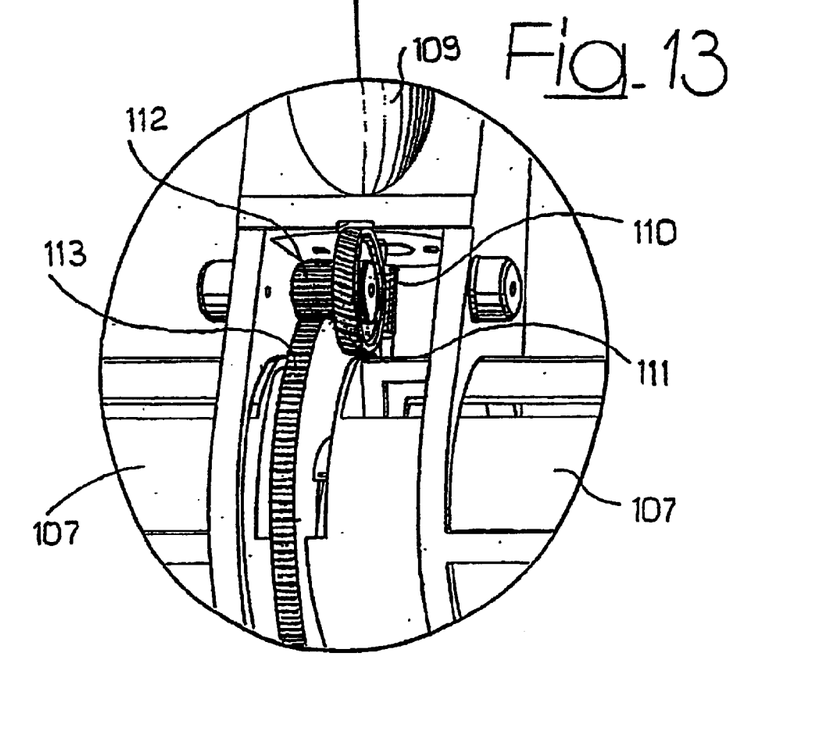
FIG. 13 illustrates, at an enlarged scale, a detail of FIG. 12.
Figure 14:
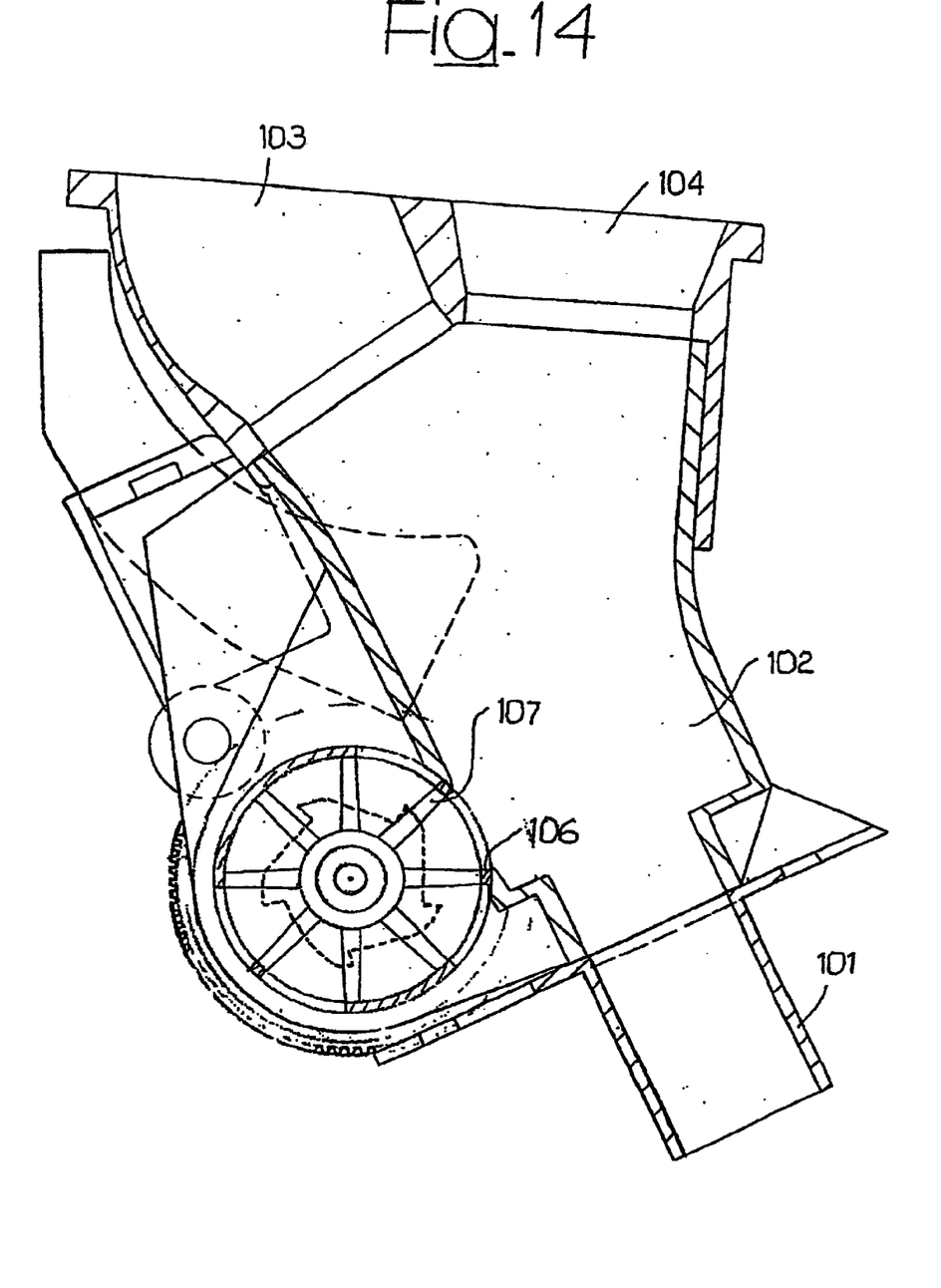
FIG. 14 illustrates, at an enlarged scale, a section along the line XIV—XIV of FIG. 10.

FIGS. 11–16 illustrate a variant of the assembly of FIG. 1. According to this variant, the body of the distributor assembly, designated as a whole by the reference number 100 comprises a plurality of inlet connections 101, which define a passage 102 (FIG. 14), which branches into two ducts 103, 104 that give out onto the top face 105 of the assembly. Once again with reference to FIG. 14, a side wall of the inlet duct 102 has an opening 106 controlled by a respective rotating cylinder 107. As may be seen in FIGS. 11 and 12, two control cylinders 107 that are mutually coaxial are provided. However, unlike in the case of the assembly of FIG. 1, the two cylinders 107 are not concentric, but are set one as the prolongation of the other. Each one of them controls a bank of three pairs of outlet ducts 103, 104. As envisaged in the case of the assembly of FIG. 1, each of the cylinders 107 (FIG. 10) is mounted so that it can rotate within fins 108 that form part of the structure of the assembly and has a wall with open portions and closed portions having the purpose of controlling the openings 106. The movement of the two cylinders 107 is controlled by a single motor assembly set in a casing 109 that forms part of the structure of the assembly and has an output shaft that controls a worm screw 110. The worm screw 110 meshes with a gear wheel 111 (FIG. 13), which transmits the rotation by means of a pinion 112 coaxial with a gear wheel 113, which is mounted so that it turns on the structure of the assembly between the two ends facing one another of the two cylinders 107.

Figures 15, 16:
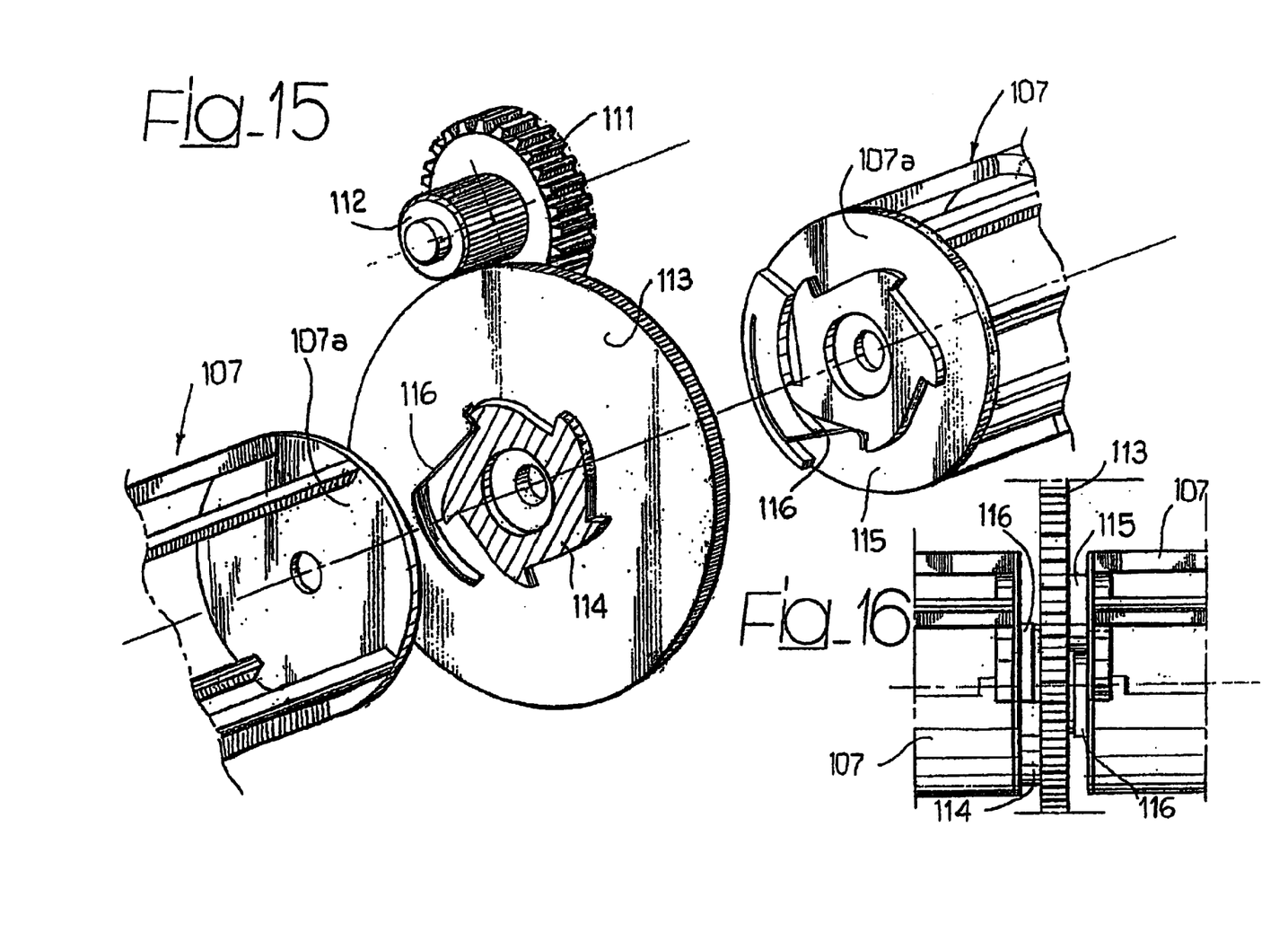
FIG. 15 is an exploded perspective view at an enlarged scale of the detail of FIG. 13.
FIG. 16 is a side view at an enlarged scale of a detail of FIG. 12.

As may be seen in FIGS. 15 and 16, the gear wheel 113 has on its two opposed faces two ratchets 114, 115, respectively, which are connected in rotation with the wheel 113. Each ratchet 114, 115 co-operates with elastic elements 116 carried by the respective facing ends 107a of the cylinders 107.

The electric control motor is a reversible electric motor, designed to cause rotation in one direction or in the other of the gear wheel 113, by means of the transmission 110, 111, 112. In each of the two directions of rotation, the gear 113 transmits its rotation to just one of the two cylinders 107 by means of a respective ratchet mechanism made up of one of the two ratchets 114, 115 and of the elastic elements 116 that co-operate with it. For each of the two directions of rotation, one of the two cylinders is driven in rotation—whilst the other cylinder remains stationary—in so far as its respective ratchet can rotate, causing repeated jumps of the respective elastic elements 116.

Of course, without prejudice to the principle of the invention, the details of construction and the embodiments may vary widely with respect to what is described and illustrated herein purely by way of example, without thereby departing from the scope of the present invention.

What is claimed is:

1. An air-distribution system, comprising:
   at least one inlet duct for a flow of air;
   a plurality of mouths for outflow of the air into an environment; and
   an air-distributing device, comprising:
   an inlet (3), which receives the air-flow from the aforesaid inlet duct; and
   a plurality of outlets, located at a distance from said outflow mouths and connected to the latter by respective pipes,
   characterized in that said air-distributing device further comprises:
   a passage (6S; 6D) connected to said air-flow inlet duct; and
   means associated to said passage for deviating the air-flow in one first or one second direction (7S, 7C; 7D) by the Coanda effect, towards respective first and second outlets,
   wherein said passage is constituted by a main duct (6S; 6D), which has one inlet end and comes out at the opposite end in a first secondary duct (7S, 7C) and a second secondary duct (7C, 7D), which branch off from the main duct according to two distinct directions and lead to said first and second outlets,
   wherein said deviating means are designed to modify the geometry of the main duct in such a way as to control the direction of the flow by the Coanda effect, and
   wherein said deviating means comprise:
   one or more control openings (9) formed in one wall (8) of the main duct, and
   obturator or perturber means (10) co-operating with said openings and displaceable between an inactive condition and an active condition, so as to control the deviation of the main flow towards said first and second secondary ducts (7C, 7D) by the Coanda effect, without substantially involving any variation in the air-flow rate through the main duct.

2. The air-distribution system according to claim 1, characterized in that said system comprises a plurality of main ducts (6S; 6D) set alongside one another, each coming out into two secondary ducts (7S, 7C; 7C, 7D) and each having a respective control opening (9).

3. The air-distribution system according to claim 2, characterized in that the control openings (9) of the various main ducts are aligned with respect to one another, and in that the obturator means (10) of the control openings (9) are in common.

4. The air-distribution system according to claim 3, characterized in that the common obturator means (10) of the control openings (9) comprise two or more rotating cylinders (11, 12) having walls (11a, 12a), which have a plurality of openings (13) arranged and shaped in such a way that different possible combinations of opening and closing of the various control openings (9) are obtained in the different positions of the two rotating cylinders (11, 12) with respect to one another.

5. The air-distribution system according to claim 4, characterized in that the two rotating cylinders (107) are set one as the prolongation of the other and present facing ends that may be operated selectively by ratchet means (114, 115, 116) controlled by a reversible electric motor (109).

6. The air-distribution system according to claim 4, designed to be used in a motor vehicle, comprising a body (1) including a main section (2) which defines a main duct (3) that divides into two auxiliary ducts (5D, 5S), each of which feeds two or more main ducts (6S; 6D) set vertically one above the other, each main duct (6S; 6D) in turn branching into two, secondary ducts (7S, 7C; 7C, 7D) lying in the same plane as the corresponding main duct in such a way as to define two sets of two or more outlet openings set vertically one above another both on the right-hand side and on the left-hand side of the body (1).

7. The air-distribution system according to claim 6, characterized in that the concentric rotating cylinders (11, 12) are set with their axes directed vertically substantially at the centre of the body (1) of the device so as to control a plurality of control openings (9), which are set vertically one on top of another on two opposite sides of the assembly formed by the rotating cylinders (11, 12).

8. The air-distribution system according to claim 1, characterized in that the deviating present a bistable operation.

9. The air-distribution system according to any one of claims 1 to 7, characterized in that the deviating means present a bistable operation.

10. The air-distribution system according to claim 1, characterized in that the aforesaid obturator or perturber means are controlled by an actuator of a type chosen from among electromagnetic, hydraulic, pneumatic, and piezoelectric actuators, electrorestrictive polymers, and shape-memory actuators.

* * * * *